US009547945B2

(12) United States Patent
McCabe et al.

(10) Patent No.: US 9,547,945 B2
(45) Date of Patent: Jan. 17, 2017

(54) INTEGRATION OF AN AUTONOMOUS INDUSTRIAL VEHICLE INTO AN ASSET MANAGEMENT SYSTEM

(75) Inventors: Paul P. McCabe, Binghamton, NY (US); Timothy E. Donahue, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 298 days.

(21) Appl. No.: 13/372,941

(22) Filed: Feb. 14, 2012

(65) Prior Publication Data

US 2012/0239224 A1    Sep. 20, 2012

Related U.S. Application Data

(60) Provisional application No. 61/454,024, filed on Mar. 18, 2011.

(51) Int. Cl.
| | | |
|---|---|---|
| *G05D 1/02* | (2006.01) | |
| *G07C 5/00* | (2006.01) | |
| *B66F 9/06* | (2006.01) | |

(52) U.S. Cl.
CPC .............. *G07C 5/008* (2013.01); *B66F 9/063* (2013.01); *G05D 1/0297* (2013.01); *B60L 2200/42* (2013.01); *B60L 2240/622* (2013.01); *B60L 2260/32* (2013.01); *G05D 1/0236* (2013.01); *G05D 1/0246* (2013.01); *G05D 1/0265* (2013.01); *G05D 1/0272* (2013.01);
(Continued)

(58) Field of Classification Search
CPC .............. G08G 1/16; G05D 1/02; G06F 7/00; G06F 19/00

USPC .......................... 701/2, 16, 25, 28, 50, 301
See application file for complete search history.

(56) References Cited

U.S. PATENT DOCUMENTS

| | | | |
|---|---|---|---|
| 4,942,529 A | | 7/1990 | Avitan et al. |
| 5,163,001 A | * | 11/1992 | Luke, Jr. .......... G05B 19/41895 180/169 |

(Continued)

FOREIGN PATENT DOCUMENTS

| | | |
|---|---|---|
| FR | 2594818 | 8/1987 |
| FR | 2925013 | 6/2009 |

OTHER PUBLICATIONS

Extended European Search Report, Appln. No. 12159422.0, dated Jul. 3, 2012.

(Continued)

*Primary Examiner* — Yonel Beaulieu
*Assistant Examiner* — Martin Weeks
(74) *Attorney, Agent, or Firm* — Quarles & Brady LLP

(57) ABSTRACT

A control system operates an industrial vehicle that includes a propulsion drive system and a guidance and navigation system operatively connected to the propulsion drive system to control motion of the industrial vehicle along a path, in an unmanned, autonomous mode. A wireless communicator transmits vehicle operational data to an asset management computer located remotely from the industrial vehicle, and receives commands from the asset management computer for remotely controlling operation of the industrial vehicle. For example, when the vehicle encounters an obstacle in the path a message indicating that event is sent to the asset management computer where a human operator can send a command which instructs the industrial vehicle how to avoid the obstacle.

20 Claims, 4 Drawing Sheets

(52) U.S. Cl.
CPC ... *G05D 1/0278* (2013.01); *G05D 2201/0216* (2013.01); *Y02T 10/7291* (2013.01); *Y02T 90/16* (2013.01); *Y02T 90/162* (2013.01)

(56) References Cited

U.S. PATENT DOCUMENTS

| | | | |
|---|---|---|---|
| 5,938,710 | A | 8/1999 | Lanza et al. |
| 6,339,735 | B1 * | 1/2002 | Peless et al. ............... 701/23 |
| 6,480,768 | B1 | 11/2002 | Torii |
| 6,484,096 | B2 * | 11/2002 | Wong et al. ............... 701/472 |
| 6,767,175 | B2 * | 7/2004 | Fujita et al. ............... 414/631 |
| 7,460,016 | B2 * | 12/2008 | Sorenson et al. .......... 340/572.7 |
| 7,478,817 | B1 * | 1/2009 | Carrier ...................... 180/6.48 |
| 7,953,526 | B2 | 5/2011 | Durkos et al. |
| 2004/0122570 | A1 * | 6/2004 | Sonoyama et al. ............ 701/23 |
| 2005/0125098 | A1 | 6/2005 | Wang et al. |
| 2006/0089844 | A1 | 4/2006 | Dickinson et al. |
| 2008/0269017 | A1 * | 10/2008 | Ungari ........................... 482/4 |
| 2009/0222161 | A1 * | 9/2009 | Tsai et al. ...................... 701/30 |
| 2010/0019570 | A1 * | 1/2010 | Kade ..................... B60R 16/03 307/10.1 |
| 2010/0106344 | A1 | 4/2010 | Edwards et al. |
| 2010/0176922 | A1 * | 7/2010 | Schwab et al. ............. 340/10.1 |
| 2010/0235099 | A1 * | 9/2010 | Sakai et al. ................. 701/301 |
| 2011/0022442 | A1 | 1/2011 | Wellman et al. |
| 2011/0153172 | A1 * | 6/2011 | Anderson ..................... 701/50 |
| 2012/0005031 | A1 * | 1/2012 | Jammer ......................... 705/16 |

OTHER PUBLICATIONS

Siemens; Siemens Develops Autonomous Navigation System for Forklifts; www.industrialit.com.au/news; Dec. 12, 2011.

* cited by examiner

INTEGRATION OF AN AUTONOMOUS INDUSTRIAL VEHICLE INTO AN ASSET MANAGEMENT SYSTEM

CROSS-REFERENCE TO RELATED APPLICATION

This application claims benefit of U.S. provisional patent application No. 61/454,024 filed on Mar. 18, 2011.

STATEMENT CONCERNING FEDERALLY SPONSORED RESEARCH OR DEVELOPMENT

Not applicable.

BACKGROUND OF THE INVENTION

1. Field of the Invention

The present invention relates to industrial vehicles, such as lift industrial vehicles; and more particularly to a system for sensing performance characteristics of an industrial vehicle and using those characteristics to manage the operation of the vehicle.

2. Description of the Related Art

Industrial vehicles of various types, including material handling vehicles, are used to move items inside a factory, a warehouse, a freight transfer station, a store, or other type of facility. Traditionally these industrial vehicles were controlled by an on-board human operator. In order to effectively and efficiently operate a warehouse, for example, it is important to ensure that the equipment and operators are as productive as possible. For a warehouse to compete on the global level, continually improving productivity of industrial vehicle use is vital to reducing costs. To meet these goals, warehouse management systems are frequently employed to control inventory, ensure proper maintenance of equipment, and to monitor operator and equipment efficiency. In these warehouse management systems, a centralized computer system monitors inventory flow, use of the industrial vehicle, vehicle maintenance status, and operator performance.

To provide these functions, data was gathered from each industrial vehicle. In order to gather the data, sensors on the industrial vehicle fed data to a dedicated onboard computer. The data was stored in that computer and occasionally transferred from storage to an central computer system at the facility in which the industrial vehicle operated. The central computer system analyzed the data from all the vehicles at the facility to determine the performance of each vehicle and of the different operators. The data analysis also indicated when maintenance and repair of a vehicle was required.

Industrial vehicles have gotten more sophisticated and a new category of autonomous guided vehicles has evolved. An autonomous guided vehicle (AGV) is a form of mobile robot that transports goods and materials from one place to another in a constrained environment, such as a factory or a warehouse. Some AGV's followed a wire buried in the floor and thus were limited to traveling along a fixed path defined by that wire. Guidance technology developed further so that the vehicle was not confined to a fixed path. Here reference markers, referred to as fiducials, were placed periodically along various paths that could be traveled by the AGV. In one implementation, each fiducial had unique appearance or optically readable code, e.g. a unique barcode. An AGV was assigned a path defined by a sequence of the fiducials along that path. An optical sensor on the AGV sensed adjacent fiducials as the vehicle travelled and the unique appearance or code of each fiducial enabled the vehicle to determine its present location in the facility and the travel direction along the assigned path.

SUMMARY OF THE INVENTION

A control system, for operating an industrial vehicle in a facility, includes an asset management computer located remotely from the industrial vehicle. Onboard the industrial vehicle is a propulsion drive system for propelling the vehicle and a guidance and navigation system operatively connected to the propulsion drive system to control motion of the industrial vehicle along a path in an unmanned, autonomous mode. A wireless communicator, coupled to the guidance and navigation system, transmits vehicle operational data to the asset management computer and receives commands from the asset management computer for remotely controlling operation of the industrial vehicle.

When an industrial vehicle that is operating in the unmanned, autonomous mode becomes incapacitated, a message indicating that incapacity is sent to the asset management computer. This produces an alert to supervisory personnel, who respond by taking corrective action. That corrective action may involve sending commands to the industrial vehicle to resolve the incapacity. For example, if the autonomously operating industrial vehicle encounters an obstacle in its path, the command from the asset management computer may direct the vehicle around the obstacle. For this purpose the guidance and navigation system may have a camera that produces an image of the obstacle and that image is transmitted to the remote asset management computer where it is displayed to a person.

In another embodiment, the operational data relates to a rechargeable energy source onboard the industrial vehicle. From that operational data a determination can be made that the source requires recharging. That determination may be made onboard the vehicle and a recharging needed message sent to the asset management computer to alert the supervisory personnel. The supervisory personnel may respond by remotely controlling the industrial vehicle to travel to recharging equipment. Alternatively, the onboard determination that recharging is required may cause the guidance and navigation system to automatically direct the industrial vehicle to travel to recharging equipment in the in the unmanned, autonomous mode.

DETAILED DESCRIPTION OF THE INVENTION

The present invention relates generally to operation of an industrial vehicle. Although the invention is being described in the context of a pallet truck used at a warehouse, the inventive concepts are applicable to other types of industrial vehicles, and their use in a variety of facilities, such as a factories, freight transfer stations, warehouses, and stores, for example.

Figure 1:
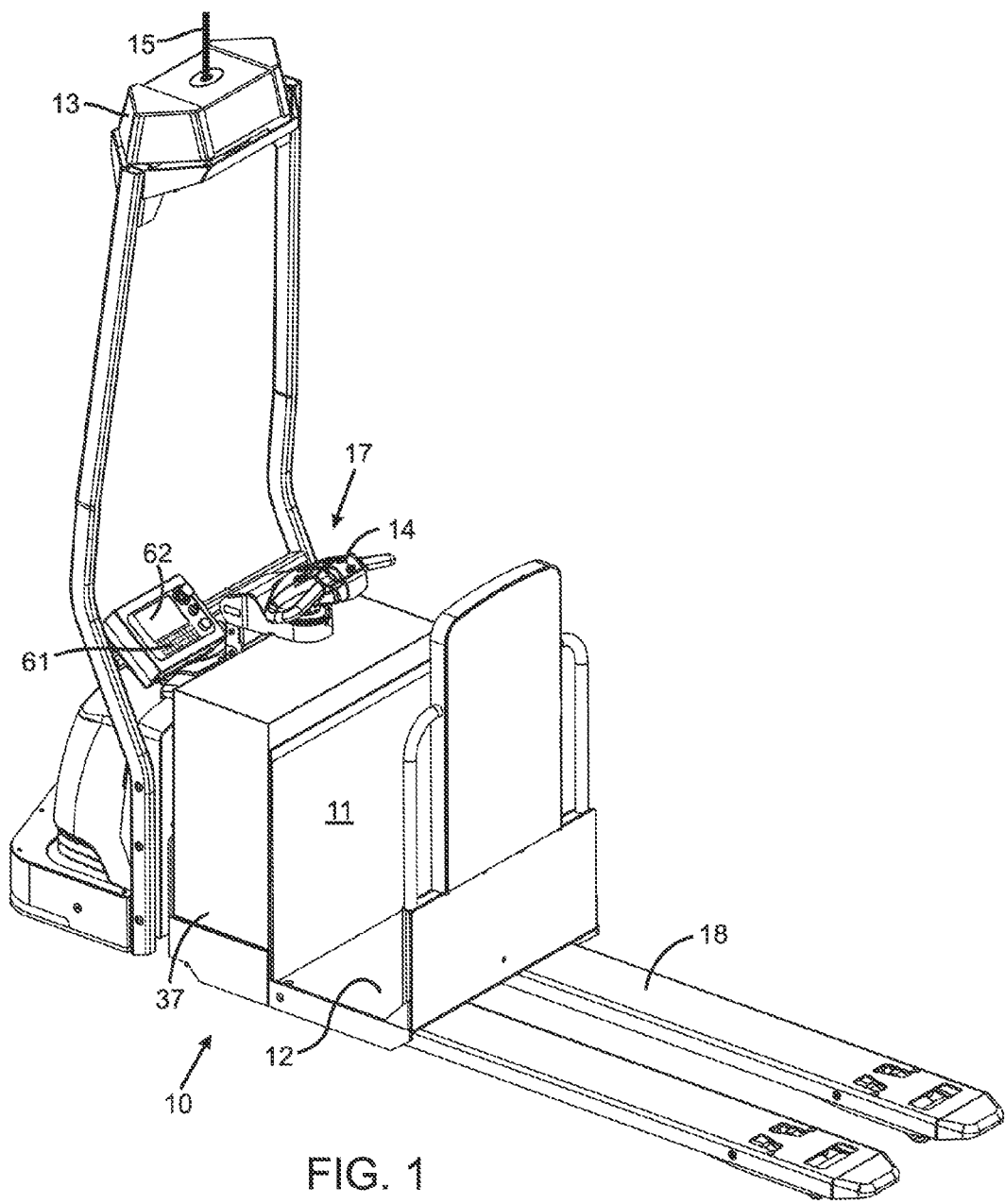
FIG. 1 is a perspective view of an industrial vehicle according to the present invention.

With initial reference to FIG. 1, an industrial vehicle 10, specifically a pallet truck, includes an operator compartment 11 with an opening for entry and exit by the operator. Associated with the operator compartment 11 is a control handle 14 that is one of several operator controls 17. The industrial vehicle 10 has a load carrier 18, such as a pair of forks, that is raised and lowered with respect to the frame of the vehicle. As will be described in further detail, a communication system on the industrial vehicle is able to exchange data and commands via an antenna 15 and a wireless signal with an external warehousing system.

Industrial vehicle 10 further includes a guidance and navigation system (GANS) 13. Any commercially available guidance and navigation system may be used to determine a path for the industrial vehicle, sense environmental conditions outside the vehicle, and operate a propulsion drive system 25 to guide the vehicle along the defined path. For example, the GANS 13 can determine its location and the travel path by sensing a buried wire, tape on the building floor, or magnetic markers adjacent the path, i.e. environmental conditions. Alternatively, the GANS 13 can employ a laser scanner to sense fiducials placed throughout the warehouse to define desired paths. Yet another commercially available GANS 13 has one or more video cameras, the output signals from which are processed by image recognition software to sense the environmental conditions. A dead reckoning guidance technique also may be utilized. For systems using video cameras or dead reckoning guidance techniques, the industrial vehicle is taught each path by manually driving the vehicle while the GANS 13 "learns" the path.

Thus the industrial vehicle 10 is a hybrid which can be controlled by a human operator who is on-board in the operator compartment 11 or controlled in an unmanned, autonomous mode by the GANS 13.

Figure 2:
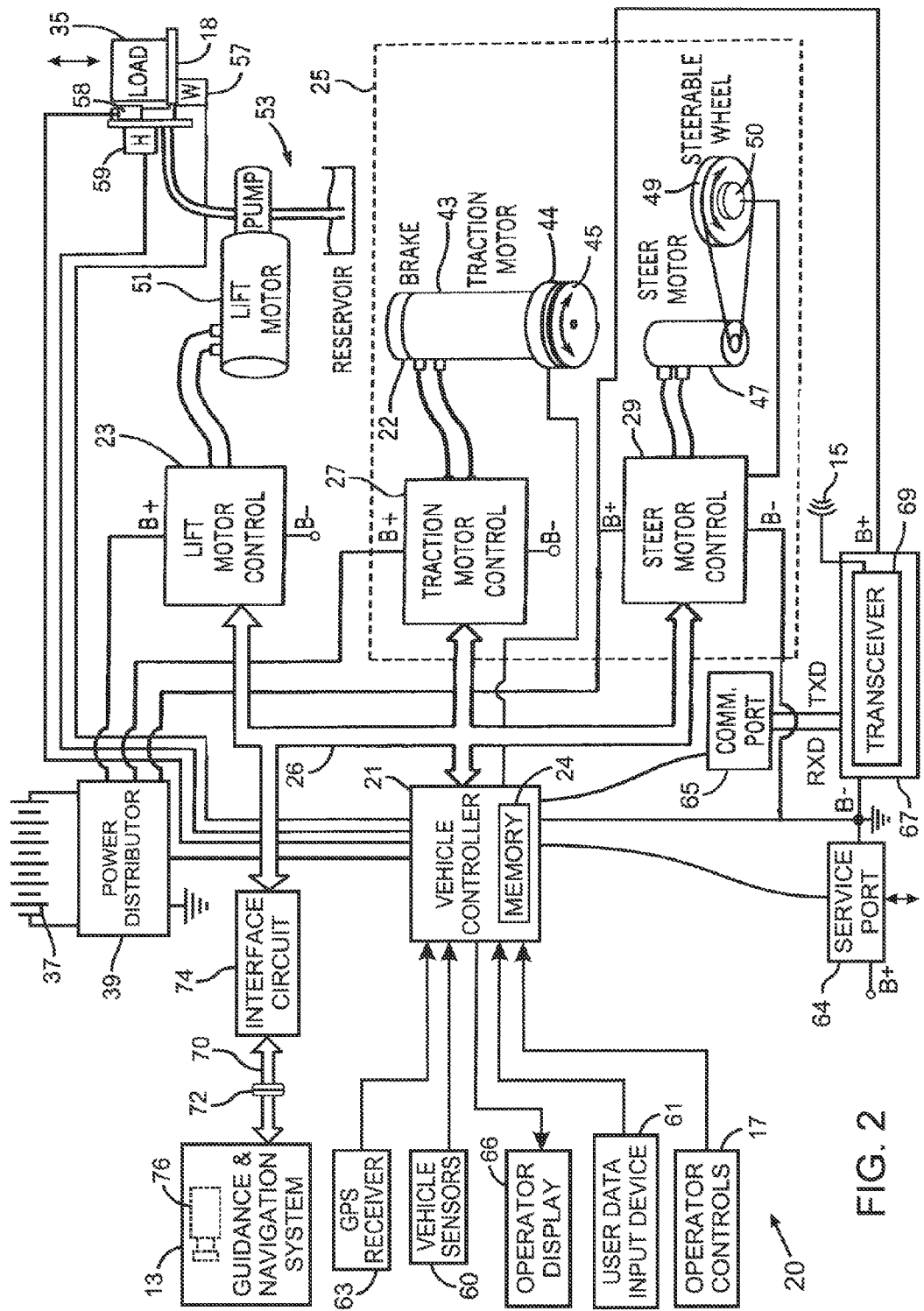
FIG. 2 is a block diagram of a control system for the industrial vehicle.

FIG. 2 is a block diagram of a control system 20 onboard the industrial vehicle 10. The control system 20 comprises a vehicle controller 21 which is a microcomputer based device that includes memory 24, analog to digital converters, and input/output circuits. The vehicle controller 21 executes a software program that responds to commands from either operator controls 17 or the GANS 13 and operates vehicle components that propel the industrial vehicle and handle loads being transported. The controller's input/output circuits receive operator input signals from the operator controls 17 to activate and govern operation of the vehicle functions, such as forward and backward travel, steering, braking, and raising and lowering the load carrier 18. In response to the operator input control signals, the vehicle controller 21 sends command signals via a first communication network 26 to each of a lift motor control 23 and a propulsion drive system 25 comprising a traction motor control 27 and a steer motor control 29. The propulsion drive system 25 provides a motive force for propelling the industrial vehicle 10 in a selected direction, while the lift motor control 23 drives load carrier 18 to raise or lower a load 35, such goods being warehoused. The first communication network 26 may be any of several types of well-known networks for exchanging commands and data among components of a machine, such as for example the Controller Area Network (CAN) serial bus that uses the communication protocol defined by ISO-11898 promulgated by the International Organization for Standardization in Geneva, Switzerland.

The industrial vehicle 10 is powered by a rechargeable energy source, such as a multiple cell battery 37, that is electrically coupled to the vehicle controller 21, propulsion drive system 25, steer motor control 29, and lift motor control 23 through a bank of fuses or circuit breakers in a power distributor 39.

The traction motor control 27 drives at least one traction motor 43 that is connected to a propulsion wheel 45 to provide motive force to the industrial vehicle. The speed and rotational direction of the traction motor 43 and the associated propulsion wheel 45 are designated by the operator via the operator control handle 14 and a throttle control, and are monitored and controlled through feedback derived from a rotation sensor 44 and a turn angle sensor 50. The rotation sensor 44 can be an encoder coupled to the traction motor 43 and the signal therefrom is used to measure the speed and distance that the vehicle travels. The turn angle sensor 50 can be coupled to the steerable wheel 49 to sense the angle at which that wheel is turned. The propulsion wheel 45 is also connected to friction brake 22 through the traction motor 43, to provide both a service and parking brake functions for the industrial vehicle 10.

The steer motor control 29 is operably connected to drive a steer motor 47 and associated steerable wheel 49 in a direction selected by the operator by rotating the control handle 14, described above. The direction and amount of rotation of the steerable wheel 49 determines the direction that the industrial vehicle 10 travels. The steerable wheel 49 may be the same as the propulsion wheel 45 or it may be a different wheel.

The lift motor control 23 sends command signals to control a lift motor 51 which is connected to a hydraulic circuit 53 that operates a lift assembly for raising and lowering the load carrier 18. As shown here, a height sensor 59 provides a signal to the vehicle controller 21 indicating the height of the load carrier with respect to the frame of the industrial vehicle 10. Similarly, a weight sensor 57 is provided on the load carrier 18. A load sensor 58 obtains an identification of the goods being transported. The load sensor 58, may be, for example, a radio frequency identification (RFID) tag reader, a Rubee™ device that complies with IEEE standard 1902.1, a bar code reader, or other device capable of reading corresponding identifiers on the goods or the pallet that holds the goods. The weight sensor 57 provides a signal that the vehicle controller 21 can employ to provide a count of the number of loads that have been transported by the industrial vehicle and maintain a tally of the amount of tonnage that has been moved. For this function the vehicle controller 21 increments the load count each time that the signal from the weight sensor 57 indicates that a load has been placed onto and then removed from the load carrier 18.

Referring still to FIG. 2, a plurality of data input and output devices are connected to the vehicle controller 21, including, for example, vehicle sensors 60 for parameters such as temperature and battery charge level, a user data input device 61, a GPS receiver 63, a communication port 65, and a maintenance service port 64. The user data input device 61 allows the vehicle operator, a supervisor, or other personnel to enter data and configuration commands into the vehicle controller 21, and can be implemented as a keyboard, a series of discrete pushbuttons, a mouse, joystick or other input device as will be apparent to those of ordinary skill in the art. The maintenance service port 64 enables a technician to connect a portable computer (not shown) to the industrial vehicle 10 for diagnostic and configuration purposes.

The vehicle controller 21 stores the sensed data regarding the vehicle operation in the memory 24. In addition, the stored data can include information produced by vehicle controller 21, such as the number of hours in operation, battery state of charge, and operational fault codes. Load lifting operations are monitored by deriving the amount of time that the lift motor 51 is active and data from the weight sensor 57 and the height sensor 59. This sensor data also can be used to measure the amount of time that the vehicle is not transporting a load, known as empty load time. Various speed parameters, such as speed and acceleration of the vehicle and of the load carrier, also are monitored on the exemplary industrial vehicle 10.

The vehicle controller 21 furnishes some of that data to an operator display 66 which presents information to the vehicle operator. The operator display 66 indicates vehicle operating parameters, such as for example, the speed of travel, battery charge level, hours of operation, time of day, and maintenance needed to be performed. Temperature sensors monitor the temperature of the motors and other components and that data can be displayed. Alert annunciations are presented on the operator display 66 to notify the operator of vehicle conditions requiring attention.

The guidance and navigation system (GANS) 13 also is coupled to the vehicle controller 21 to provide control signals for operating the lift motor control 23, the traction motor control 27 and the steer motor control 29 to guide the vehicle in the autonomous mode of operation. Specifically the GANS 13 is coupled through a connector 72 to a second communication network 70, such as another CAN serial bus that leads to an interface circuit 74. The interface circuit 74 is connected to the first communication network 26, thereby enabling messages with commands and data to be exchanged with the vehicle controller 21, as will be described. The interface circuit 74 provides isolation between the first and second communication networks 26 and 70 that prevents inappropriate signals applied to the connector 72 from adversely affecting the transfer of messages over the first communication network.

The communication port 65 is connected to a wireless communicator 67 that includes a transceiver 69 coupled to the antenna 15 for exchanging data and commands with a wireless communication system in the warehouse or factory in which the industrial vehicle 10 operates. Any one of several well-known serial communication protocols, such as Wi-Fi, can be used to exchange messages carrying commands and data via that bidirectional communication link. Each industrial vehicle 10 has a unique identifier, such as its manufacturer's serial number or a wireless communication system address, that enables messages to be specifically communicated to that vehicle.

Figure 3:
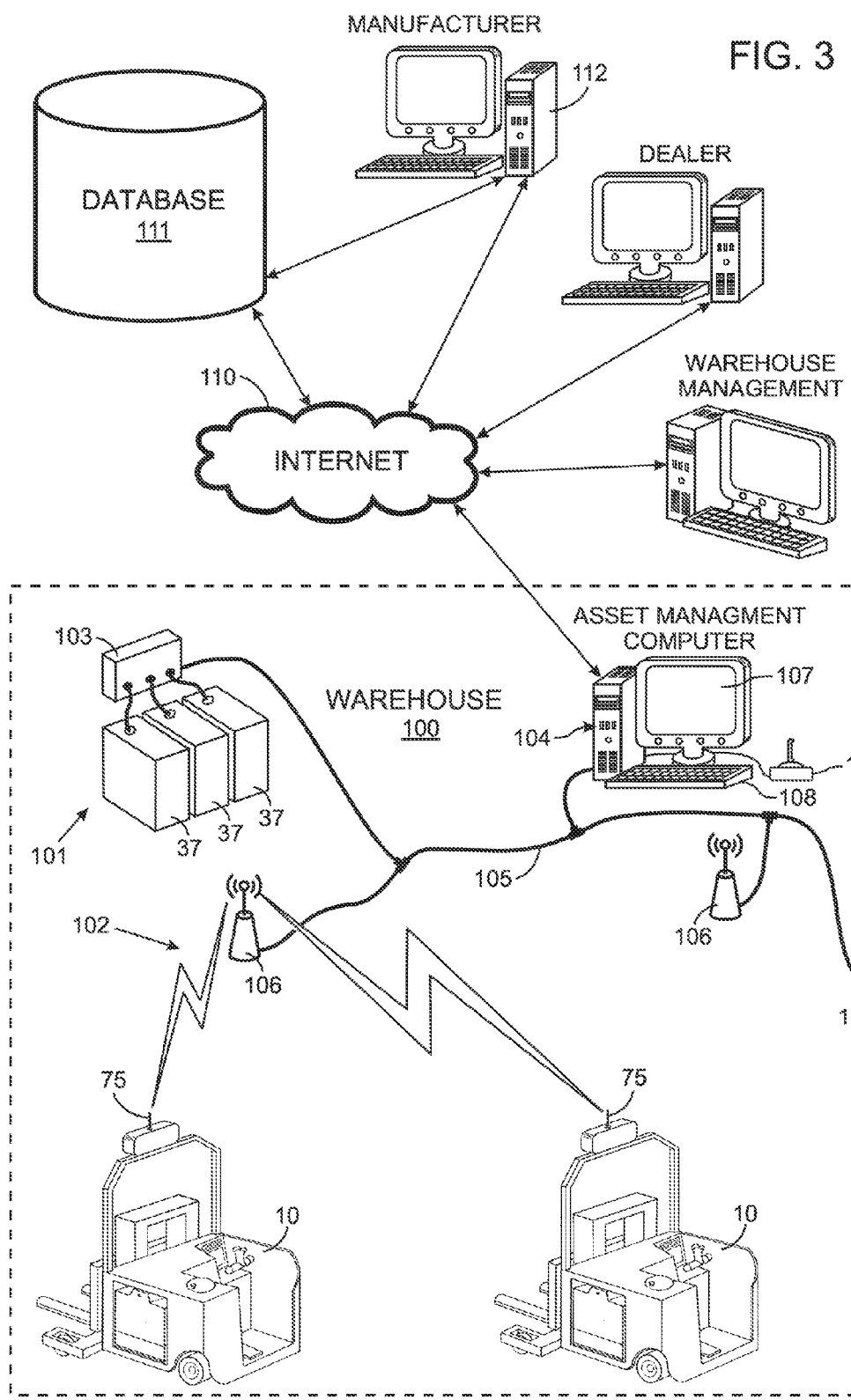
FIG. 3 depicts an exemplary vehicle fleet management system in which industrial vehicles in a warehouse communicate via a network with a central asset management computer that is linked to a remote database to which other computers have access.

Referring to FIG. 3, a warehouse 100, in which one or more industrial vehicles 10 operate, includes a bidirectional communication system 102 that links the wireless communicator 67 in each of the industrial vehicles 10 to an asset management computer 104 at a fixed location in the facility. The asset management computer 104 has a display monitor 107 and user input devices, such as a keyboard 108 and a joystick 109. The communication system 102 comprises a plurality of wireless access points 106 distributed throughout the warehouse 100, such as in the shipping dock and goods storage areas. The wireless access points 106 may be radio frequency signal transceivers that are connected via a conventional local area network 105 or a TCP/IP communications link to the asset management computer 104. Alternatively the wireless access points 106 can be wirelessly coupled, such as through a Wi-Fi link, to the asset management computer 104. The warehouse 100 has one or more battery charging stations 101 where the batteries 37 are removed from the industrial vehicles and recharged by equipment 103. The charging equipment 103 also is connected to the local area network 105 for exchanging data regarding the batteries and their recharging with the asset management computer 104.

The communication system 102 also provides a mechanism by which the location of each industrial vehicle 10 within the warehouse 100 can be determined. Periodically and one at a time, the transceiver at each wireless access point 106 broadcasts a location message that is received by all the industrial vehicles 10. The location message carries an identification of the transmitting wireless access point 106 and a time code, e.g., the time of day, designating the moment that the message was sent. Each industrial vehicle 10 has a clock that produces a similar time code. All the time code generators in the wireless access points 106 and on the industrial vehicles 10 are synchronized. Upon receiving a location message the industrial vehicle records the time code from its clock. The vehicle controller 21 employs the transmit and receive time codes to calculate the propagation time of the location message from the respective wireless access point 106 to that industrial vehicle 10. The propagation time directly corresponds to the distance that the industrial vehicle is from the respective wireless access point. The vehicle controller 21 uses the identification of the transmitting wireless access point 106, carried by the location message, to access a table stored in memory 24 and determine the fixed position of that wireless access point. Knowing the message propagation times and positions of at least three access points 106, the vehicle controller 21 uses triangulation to determine the vehicle's location within the warehouse 100. This function of the wireless access points 106 is referred to as a Local Positioning System (LPS). Alternatively, each industrial vehicle may periodically transmit the location message, which is received by several wireless access points 106. In this version, the asset management computer 104 triangulates the vehicle's location form the positions and message propagation times of at least three access points 106. It should be understood that GPS satellite signals often cannot penetrate the steel structure of many buildings and thus the LPS system is used.

The asset management computer 104 also communicates via the Internet 110 or other communication link with a management computer system 114 at the headquarters of the warehouse company. That connection enables the management computer system 114 to receive data regarding the operation of the fleet of industrial vehicle at all the warehouses in the company. Both asset management computer 104 and the warehouse management computer system 114 execute software for storing, analyzing and reporting the operating information pertaining to the industrial vehicles.

The connection of the asset management computer 104 to the Internet 110, or other external communication link, enables the asset management computer to access a database 111 that contains data provided from a manufacturer computer 112 by the manufacturer of the vehicles. The data gathered from the industrial vehicles at the warehouses also is uploaded and stored in the database 111. Selected data may be accessed by, for example, warehouse management personnel or vehicle dealers, who connect to the database 111 through the Internet 110. The various computers can analyze and compare the data gathered from all the industrial vehicles at a given warehouse, at all facilities of the warehouse company, or all the vehicles made by the manufacturer.

INDUSTRIAL APPLICABILITY

The present industrial vehicle 10 can be operated in either a manned, manual mode in which an on-board human operator controls the vehicle's functions, in an unmanned, autonomous (robotic) mode in which the GANS 13 automatically controls the vehicle operation without requiring the presence of a human operator, or in a remote control mode in which a person at the asset management computer 104 send commands to operate the vehicle.

Figure 4:
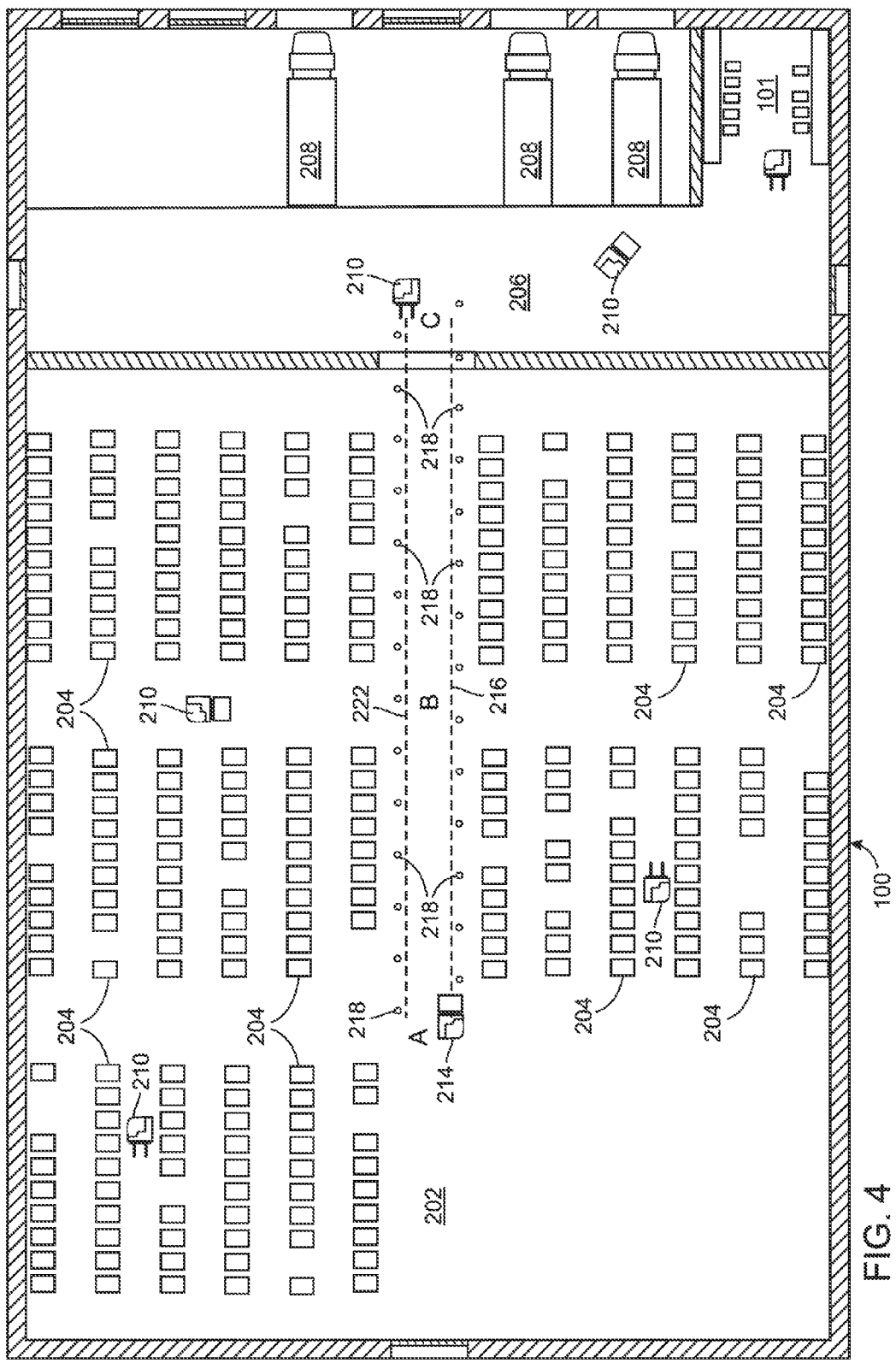
FIG. 4 is a floor plan of a warehouse in which the industrial vehicles operate.

With reference to FIG. 4, the warehouse 100 comprises a storage area 202 where a plurality of pallets 204 of goods are stored and a loading dock area 206 for transferring the goods off and on delivery trucks 208. The warehouse also has an area for the battery recharging station 101. A given warehouse may have several battery recharging stations at geographically spaced apart locations.

A plurality of industrial vehicles 210 travel around the warehouse 100 unloading delivery trucks 208, placing the goods on the pallets 204, and subsequently removing the goods from a storage area and loading them onto other delivery trucks. For example, a first operator manually drives a hybrid manned-autonomous industrial vehicle 214 through the storage area 202 to the appropriate location at which the desired goods are stored and those goods are loaded onto the load carrier 18 of the vehicle. Then the industrial vehicle is driven to a staging area A. At staging area A, the first operator employs the user data input device 61 to place the industrial vehicle 214 in the autonomous mode with instruction to travel along path 216 to staging area C. The first operator then steps off the industrial vehicle 214 which action is detected by a pressure sensitive floor mat 12 in the operator compartment 11 (see FIG. 1). Thereafter, the industrial vehicle commences autonomous operation traveling along the path 216 to staging area C.

As an alternative to an operator manually entering the path assignment into the user data input device 61 on the industrial vehicle 10, a central dispatcher can enter the path assignment at the asset management computer 104 from which the path assignment is transmitted via the warehouse communication system 102 to the vehicle. Upon receipt by the vehicle, the new path assignment is transferred to the guidance and navigation system 13 for use in operating the vehicle in the autonomous mode.

In either data entry case, the autonomous mode command and the assigned path are conveyed from the vehicle controller 21 through the first communication network 26, the interface circuit 74, and the second communication network 70 to the guidance and navigation system 13. The GANS 13 then assumes control over the operation of the industrial vehicle 214. That control consists of the GANS 13 sending commands to the vehicle controller 21 that mimic the digital data generated by the manual operator controls 17, such as the control handle 14. Thus, the vehicle controller 21 receives commands from the GANS 13 that indicate the speed and direction at which the traction motor 43 should be driven and the direction and degree to which the steer motor 47 should turn the steerable wheel 49 in order to propel the vehicle along the assigned path. That control by the GANS 13 also includes sending commands to the vehicle controller 21 when the brake 22 is to be applied or released.

As the industrial vehicle 214 travels in the autonomous mode, sensors on the GANS 13 detect the position of the vehicle relative to the assigned path 216. In one types of GANS, video camera or laser scanners detect fiducials 218 that are placed periodically along various paths in the warehouse. The fiducials 218 may be placed on the warehouse floor, walls, pillars, and shelves. Each fiducial 218 has unique appearance or optically readable code, e.g. a unique barcode, thereby enabling the GANS 13 to determine the present position of the vehicle and the direction to take to reach the next fiducial 218 along the assigned path 216. This information about the vehicle's environment enables the GANS 13 to ascertain when and how to turn the steerable wheel 49 so that the industrial vehicle 214 travels along the assigned path 216. Other guidance techniques may be used by the GANS 13, such as tracking a buried wire, tape on the floor, or magnetic markers along the path or a using image recognition software to identify physical features of the warehouse along the assigned path.

More sophisticated guidance and navigation systems 13 are able to guide a vehicle among the pallets 204 to a particular storage location and place or remove an pallets. In this type of system in addition to controlling the traction motor 42 and the steer motor 47, the GANS 13 also sends commands to the lift motor control 23 to raise and lower the load carrier 18. Those commands mimic the commands received from the manual operator controls 17 to operate the lift motor 51. For the load carrier function, the height sensor 59 and other sensors 57-59 on the load carrier 18 send signals to the vehicle controller 21 which relays that data to the guidance and navigation system 13 so that the latter system can determine the response of the lift motor to the raise and lower commands. Additional sensors such as cameras and laser scanners are placed on the load carrier 18 or the vehicle to detect the particular storage location at which the desired goods are stored.

In the autonomous operating mode, the vehicle controller 21 automatically activates various components on the industrial vehicle, which are activated by the operator in the manual mode. For example, upon entering a freezer area of a warehouse, as indicated by the location from the GPS receiver 63, the LPS, or a temperature sensor, the vehicle controller 21 turns on heaters on the vehicle that are required for operation in that cold environment. If the temperature sensor detects an extremely high ambient temperature, other sensors that are temperature sensitive may be recalibrated to properly function at that higher ambient temperature. As another example, if the vehicle controller 21 in response to feedback signals from the traction motor control 27 detects a slippery floor, the speed at which the traction motor 43 is driven can be reduced to compensate for the slippery condition.

The various load sensors 57-59 and other sensors associated with the suspension system can indicate an imbalance of the load 35 or uneven wheel loading, that can adversely affect vehicle stability. Depending upon the severity of that imbalance or uneven wheel loading, reduced operation the industrial vehicle can be by initiated the vehicle controller 21 in the autonomous mode until the condition is remedied.

Returning to the movement of the industrial vehicle 214 in the warehouse 100 in FIG. 4, upon the GANS 13 detecting arrival at staging area C, the industrial vehicle automatically stops and awaits for further operating commands. Eventually a second operator steps onboard and places the industrial vehicle 214 into manual mode. This operator then manually drives the industrial vehicle onto one of the delivery trucks 208 parked at the loading dock and deposits the goods in that truck. The second operator then returns the industrial vehicle 214 to point C and points the vehicle toward staging area A.

At this time, the second operator enters commands into the user data input device 61 to indicate path 222 for the vehicle to travel to staging area A and initiates the autonomous mode. After the second operator exits the operator compartment 11, the industrial vehicle 214 commences traveling along path 222 to point A. Upon arriving at staging area A, the industrial vehicle stops and waits for another operator to control the vehicle manually. Note that the industrial vehicles also can be assigned to travel between staging areas B and C in the autonomous mode in order to obtain goods from storage closer to staging area B.

Some facilities have automatic load and unload equipment. In such instances, manned operation of the vehicle is not required. Here the industrial vehicle 10, operating in the autonomous mode, travels to a designated position and interfaces with the automatic loading equipment under the control of the GANS 13. After a load has been picked up on the load carrier 18, the industrial vehicle 10 travels autonomously along an assigned path to a destination at which the automatic unloading equipment is located. The vehicle interfaces with that equipment and deposits the load. Thereafter the industrial vehicle 10 autonomously travels to another assigned location to pick up another load. In this case, the work assignments may be received from the asset management computer 104 and the operation of the vehicle in the autonomous mode is governed by the GANS 13.

Although previous autonomous vehicles were known, the condition of the vehicle, the state of its available energy supply, and awareness of surrounding environmental conditions often incapacitated the unmanned vehicle, which could not deal with many of those conditions and situations without human intervention. Thus, the vehicle often was left stationary in a non-productive state. For example, if the autonomous guided vehicle (AGV) encountered an obstacle in its path, the guidance system sensors would detect that object and stop the vehicle before a collision occurred. However, the vehicle would then remain in that stationary state until the obstacle was removed. In many instances, the AGVs were used in remote locations of a warehouse where a stationary incapacitated vehicle could remain inactive for an extremely long period of time until a person happened to come upon the vehicle and correct the situation.

The present system for an industrial vehicle 10 overcomes some of the previous drawbacks with respect to AGVs by coupling the GANS 13 to the vehicle controller 21 for the exchange of operational data. This enables the vehicle controller to send operational data regarding the condition of the vehicle via the wireless communicator 67 to the warehouse communication system 102 and particularly the asset management computer 104, where human operators can be alerted to the status of the vehicle.

During operation of the industrial vehicle 10 in both the manual and autonomous modes, the vehicle controller 21 gathers data from the vehicle sensors 60 regarding various operating conditions and states of different components. For example, the temperature of the motors, the supply of fluid in the hydraulic circuit 53 are obtained and stored in memory 24. The speed of the vehicle is read from the rotation sensor 44 and the direction and degree of steering from the steer motor control 29 are also determined and stored in memory 24. Data from the lift motor control 23 also provides information about the status of the load carrier 18 which is periodically read to provide a count of the number of loads that have been carried as well as the weight of each load as sensed by the weight sensor 57. In addition, data from the power distributor 39 as to the state of the battery 37, or other type of energy source, are provided to the vehicle controller.

In addition, the vehicle controller 21 receives information from the guidance and navigation system 13 via the second communication network 70. This information can include the location of the vehicle as a supplement to any information received from the GPS receiver 63 or the LPS. Any traffic management issues encountered by the GANS 13 produces other data which is retained in the memory 24. For instance, if the vehicle encounters an obstacle, an indication of that effect is sent by the GANS to the vehicle controller which first responds by commanding the traction motor control 27 to stop the vehicle by discontinuing application of power to the traction motor 43 and activating the brake 22. Thereafter, an obstacle indication is stored in memory 24 for relaying to the asset management computer 104. In addition, other parameters sensed and fed to the vehicle controller 21 indicate other traffic management conditions, such as a slippery floor which makes traction and steering irregular.

Periodically or on the occurrence of a particular event, such as a request from the asset management computer 104, the vehicle controller 21 transfers the accumulated data from memory 24 to the wireless communicator 67. The data then are transmitted by the wireless communicator 67 in a message to the warehouse communication system 102 through message conveyed to the asset management computer 104. The message identifies the particular industrial vehicle 10.

The asset management computer 104 receives similar operating data from all the other industrial vehicles 10 within the warehouse 100. The asset management computer 104 in FIG. 2 analyzes the vehicle data to determine the performance and efficiency of each industrial vehicle. The analysis of the performance and efficiency of an industrial vehicle may employ benchmark data from the manufacturer and data gathered from vehicle operations at other facilities.

Manufacturers of industrial vehicles typically conduct productivity tests that characterize the performance of a particular vehicle model. For example, a standardized test may be defined as a picking up a standard weight load at a specified height, transporting the load over a predefined path of a known distance, depositing the load at a given height, and traveling back to the starting point. During this action sequence, the vehicle operating parameters are sensed and stored. The action sequence is repeated several times to measure the number of such cycles that the vehicle is capable of performing per hour and produce average values for the vehicle operating parameters. This provides productivity benchmark data for that industrial vehicle model.

The operational data from each industrial vehicle in the warehouse is compared to the productivity benchmark data to determine whether every vehicle is operating according to the manufacturer's specifications. Each vehicle's operational data also are compared to similar data produced by the other warehouse vehicles during the same time period to detect if one or more of them is operating significantly less efficiently or otherwise differently than the others. Significant deviation from the benchmark data or the performance of the other vehicles of the same type indicates either a mechanical problem or an inefficient operator. Such deviations are reported to supervisory personnel at the warehouse to assist them in executing their duty to supervise operators and otherwise manage warehouse operations.

Recently gathered operational data also are compared to similar data gathered over past work periods at the warehouse from the same industrial vehicle and other vehicles of the same type or model. Significant changes in the current data from that gathered in the past also are reported to warehouse supervisory personnel as possibly indicating that maintenance needs to be performed on a particular industrial vehicle. The gathering, transmission and analysis of data regarding the operation and performance of the industrial vehicle and its operator is described in U.S. Published Patent Application No. 2009/0265059 entitled "System for Managing Operation of Industrial Vehicles" which description is incorporated herein by reference.

If that operational information gathered from a specific industrial vehicle 10 indicates a current abnormal condition, such as an abnormally high temperature or a low battery charge, the asset management computer 104 alerts supervisory personnel at the warehouse of such conditions. This allows the supervisory personnel to assess the condition of a particular vehicle and take corrective action if necessary, such as battery recharging or replacing the battery. This data review reduces unscheduled vehicle downtime and the resulting productivity loss, such as for example would occur if the battery was completely depleted when the vehicle was at a remote location in the warehouse.

The communication link between the industrial vehicle 10 and the asset management computer 104 is bidirectional. Thus the communication link enables a person at the asset management computer 104 to send control commands to the industrial vehicle 10, thereby instructing the vehicle control system 20 about corrective action to take. In the situation in which the battery 37 requires recharging, personnel at the asset management computer 104 may instruct the guidance and navigation system (GANS) 13 to direct the industrial vehicle 10 to travel to a battery recharging station 101 in the autonomous mode. Alternatively, the vehicle controller 21 may determine that battery recharging is required and command the GANS)13 to direct the industrial vehicle 10 to travel to a battery recharging station without intervention of the asset management computer 104 or a human operator.

If the guidance and navigation system 13 employs one or more video or still cameras 76, the resultant images can be transferred in a similar manner via the warehouse communication system 102 to the asset management computer 104. A monitor 107 at the asset management computer 104 displays those images for viewing by a human operator. Such image transfer may occur in response to a command issued by the asset management computer to the industrial vehicle 10 or upon occurrence of a predefined event. For example, if the industrial vehicle ceases autonomous mode operation because an object is detected in its path, an indication that cessation is transmitted from the industrial vehicle 10 to the asset management computer 104, which responds by issuing an alert to supervisory personnel in the warehouse. Such personnel can respond by sending a command message from the computer 104 to the particular industrial vehicle 10 requesting that the present image from the vehicle camera 76 be transmitted to the asset management computer. Upon receipt, the asset management computer 104 displays the image on a video monitor. This enables the supervisory personnel to view the image and determine the nature of the condition which caused the vehicle to cease operating and the appropriate corrective measures.

A person can direct the operation of the industrial vehicle 10 from the asset management computer 104 by manipulating the keyboard 108 and the joystick 109 input devices. Initially the person enters a command that causes the industrial vehicle to terminate the autonomous mode and commence the remote control mode. In the remote control mode, for example, the person is able to send commands from asset management computer 104 to the industrial vehicle 10 to control the steering, direction of travel, speed and other functions to travel around an obstacle that is in the vehicle's path. Thus a person at the asset management computer can manually operate the industrial vehicle 10 whenever necessary. When remote control no longer is required, operation of the vehicle's control system 20 is restored to the autonomous mode by another command from the asset management computer 104.

Alternatively, the supervisory personnel at the asset management computer 104 can send instructions to the industrial vehicle 10 to reprogram the GANS 13 with another path to the desired destination which avoids the object.

In another example, the vehicle sensors 60 can include one that detects an impact of the vehicle with an object. When an impact exceeding a predefined magnitude is detected, the vehicle controller 21 responds to the sensor signal by terminating all motion of the industrial vehicle 10 and transmitting an alert message via the wireless communicator 67 and the warehouse communication system 102 to the asset management computer 104. That message causes the asset management computer 104 to alert the supervisory personnel of the impact. The supervisory personnel then obtain video images from the guidance and navigation system cameras and view those images on the asset management computer 104. This enables the supervisory personnel to observe the environment of the industrial vehicle 10 and the learn the nature of the impact that occurred. Thus the supervisory personnel can determine whether the industrial vehicle can still be operated, in which case an appropriate command is sent from the asset management computer 104 to the industrial vehicle instructing that operation should be resumed and take a path away from the object that was impacted. Alternatively in the case of a significant impact, the supervisory personnel can dispatch maintenance personnel to attend to the vehicle.

If the industrial vehicle 10 remains idle for a predefined period of time, a message indicating that inactive state is transmitted from the vehicle controller 21 through the warehouse communication system 102 to the asset management computer 104. This causes the asset management computer to issue an alert to the supervisory personnel if the particular industrial vehicle should be in an active state, i.e. that vehicle has been given a work assignment. An unexpected inactive state can occur, for example, because the vehicle's battery 37 or other energy source has become depleted or because another component failed.

The present control system 20 can also implement energy conservation measures which are particularly useful to prolong the vehicle's productive work period when the energy in the battery has decreased to a low level. For example, during normal operation, the power distributor 30 provides energy consumption data, such as output voltage and current to the vehicle controller 21. The vehicle controller 21 uses that energy consumption data to derive the power consumed by the vehicle in kilowatt hours, for example. The controller also can measure the amount of power that the vehicle consumes while traversing each different path in the warehouse. The data from the power distributor 30 and the data derived by the vehicle controller 21 are transmitted through the warehouse communication system 102 to the asset management computer 104.

The power consumption data also are used in controlling the operation of the industrial vehicle. For example, at the beginning of each path assignment, the measured amount of power used to previously travel along the assigned path is compared to the present amount of energy remaining in the battery 37. That comparison enables the vehicle controller 21 to determine whether the industrial vehicle 10 is capable of traversing the assigned path. If the remaining energy in the battery 37 is insufficient, the vehicle will not perform the assignment and will transmit an alert message to the asset management computer 104 indicating the inability to perform and the battery state of charge. That transmitted information enables the warehouse supervisory personnel to redirect an industrial vehicle with a weak battery to a battery recharging station 101 in the warehouse 100.

Alternatively, when the vehicle controller 21 determines that the remaining energy in the battery 37 is insufficient for the vehicle will not perform an assignment, the control system may automatically direct the industrial vehicle 10 to the battery recharging station 101. Specifically, the vehicle controller 21 sends a message to the GANS 13 that either indicates that battery recharging is needed or that commands the GANS to travel a path to the battery recharging station 101. The GANS 13 either directly knows the present location of the vehicle or receives that location from the LPS or the GPS receiver 63. The GANS also has the fixed location of the battery recharging station 101 stored in its internal memory. From those locations the GANS is able to determine the path to use to travel to the recharging area either directly or by traveling sequentially to a series in known intermediate points in the warehouse. For example, if the industrial vehicle 214 in FIG. 4 has a deplete battery, it may first travel along path 216 to staging area C. From staging area C, the GANS may have the path to the battery recharging station 101 stored in its internal memory.

The vehicle sensors 60 also enable the vehicle controller 21 to determine when the condition of the vehicle is such that reduced, or less than normal, operating levels should occur. For example, if overheating of a component is detected, the vehicle controller 21 may reduce the speed of the vehicle in order to allow the component to cool.

The foregoing description was primarily directed to one or more embodiments of the invention. Although some attention has been given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A control system, for operating an industrial vehicle to carry objects inside a building, comprising:
   a propulsion drive system for propelling the industrial vehicle;
   sensors for gathering operational data regarding operation of the industrial vehicle while carrying the objects;
   a guidance and navigation system onboard the industrial vehicle and connected to the propulsion drive system to control motion of the industrial vehicle along a path in an unmanned, autonomous mode, wherein the guidance and navigation system is operable to receive an indication that an energy storage device onboard the industrial vehicle requires recharging, and to respond to that indication by autonomously directing the industrial vehicle along a path to a recharging area in the building;
   a wireless communicator coupled to the guidance and navigation system and operable to transmit wirelessly the vehicle data and receive wirelessly commands from an asset management computer for controlling operation of the industrial vehicle in a remote control mode, and wirelessly transmit an alert message in response to one of the sensors detecting that the industrial vehicle has become incapacitated; and
   the asset management computer located remotely from the industrial vehicle and receiving the operational data and the alert message transmitted by the wireless communicator, and comprising an input device for a person to respond to the operational data and the alert message by producing a command that is transmitted from the asset management computer for remotely controlling operation of the industrial vehicle to overcome the incapacity.

2. The control system as recited in claim 1 further comprising an additional sensor for detecting an obstacle in the path of the industrial vehicle, wherein in response to the sensor detecting the obstacle, the wireless communicator transmits an indication of the obstacle to the asset management computer.

3. The control system as recited in claim 1 further comprising a video camera for producing an image of an area adjacent to the industrial vehicle, wherein the wireless communicator transmits the image to the asset management computer.

4. The control system as recited in claim 1 further comprising a local area network inside the building and connected to the asset management computer, and comprising a plurality of wireless signal transceivers each for bidirectional communication with the wireless communicator.

5. The control system as recited in claim 4 further comprising a charging equipment for replenishing energy in the energy storage device that is onboard the industrial vehicle, wherein the charging equipment is connected to the local area network.

6. The control system as recited in claim 1 wherein in the remote control mode, the wireless communicator receives commands for controlling the propulsion drive system.

7. The control system as recited in claim 1 further comprising operator controls onboard the industrial vehicle for manual operation by a person, wherein the control system has a manual mode in which the propulsion drive system operates in response to manual operation of the operator controls.

8. A method for controlling an industrial vehicle that carries objects inside a building, wherein the industrial vehicle includes a guidance and navigation system that, in an unmanned, autonomous mode, controls motion of the industrial vehicle along a first path inside the building, said method comprising:
   gathering operational data regarding the industrial vehicle operating in the unmanned, autonomous mode;
   determining, from the operational data, that the industrial vehicle has become incapacitated;
   when the vehicle has become incapacitated, transmitting the operational data and an alert message, via a wireless communicator onboard the industrial vehicle, to an asset management computer located remotely from the industrial vehicle, wherein the operational data and the alert message relate to a rechargeable energy source onboard the industrial vehicle requiring recharging;
   when the operational data indicates that the industrial vehicle is incapacitated inside the building, transitioning from the unmanned, autonomous mode to a remote control mode; and
   in the remote control mode, in response to the alert message, transmitting a command from the asset management computer to the wireless communicator, wherein the command from the asset management computer directs the industrial vehicle to a recharging area in the building.

9. The method as recited in claim 8 wherein the operational data further indicates that the industrial vehicle became incapacitated by an obstacle in the first path and an additional command directs the industrial vehicle to travel around the obstacle.

10. The method as recited in claim 9 wherein the operational data indicates presence of an obstacle in the first path and the additional command directs the industrial vehicle along a second path that avoids the obstacle.

11. The method as recited in claim 8 wherein the guidance and navigation system, in the unmanned, autonomous mode, directs the industrial vehicle to travel to the recharging area.

12. The method as recited in claim 8 further comprising employing the operational data to determine when the rechargeable energy source requires recharging; and transmitting a recharging required message via a wireless communicator to the asset management computer.

13. A method for controlling an industrial vehicle that carries objects inside a building, wherein the industrial vehicle includes a propulsion drive system, a guidance and navigation system, and a wireless communicator for bidirectional communication with an asset management computer located remotely from the industrial vehicle, said method comprising:
 (a) operating the industrial vehicle in an unmanned, autonomous mode that comprises:
 the guidance and navigation system sensing environmental conditions outside the vehicle and in response thereto controlling the propulsion drive system to direct the industrial vehicle to travel along a first path inside the building,
 gathering operational data regarding the industrial vehicle, and
 transmitting the operational data and an alert message, from the wireless communicator onboard the industrial vehicle to the asset management computer located remotely from the industrial vehicle in response to a sensor detecting that the industrial vehicle has become incapacitated;
 (b) operating the industrial vehicle in manual mode that comprises:
 the industrial vehicle receiving control signals from operator controls that are manipulated by human operator onboard the industrial vehicle, and
 controlling the propulsion drive system in response to the control signals to direct the industrial vehicle to travel along a second path inside the building; and
 (c) operating the industrial vehicle in a remote control mode that comprises:
 the industrial vehicle receiving commands from the asset management computer in response to the operational data and the alert message from the wireless communicator, wherein the operational data and the alert message relate to a rechargeable energy source onboard the industrial vehicle requiring recharging, wherein the commands comprise a command that directs steering of the industrial vehicle and another command specifies a velocity at which a wheel propels the industrial vehicle to overcome the incapacity, and
 controlling the propulsion drive system in response to the commands, without an onboard operator, wherein the commands specify that the industrial vehicle is to travel along a third path, the third path directing the industrial vehicle to a recharging area in the building, wherein when the industrial vehicle reaches the recharging area, the commands instruct the industrial vehicle to terminate the remote control mode and commence the autonomous mode.

14. The method as recited in claim 13 wherein the commands received from the asset management computer are produced in response to real-time inputs from a person.

15. The method as recited in claim 13 further comprising in response to the operational data and the alert message transmitted from the wireless communicator, the asset management computer generating an alert indication to personnel.

16. The method as recited in claim 13 wherein the commands in the remote control mode comprise a command that instructs the industrial vehicle to terminate the autonomous mode and commence the remote control mode.

17. The method as recited in claim 13 wherein the commands that are transmitted from the asset management computer to the industrial vehicle comprise a command that instructs the industrial vehicle to terminate the autonomous mode and commence the remote control mode.

18. The method as recited in claim 13 wherein the command that is transmitted from the asset management computer to the industrial vehicle comprises a command that instructs the industrial vehicle to terminate the remote control mode and commence the autonomous mode.

19. The method as recited in claim 13 wherein the operational data indicates an obstacle in the first path, and the commands received from the asset management computer direct the industrial vehicle to travel around the obstacle.

20. A method for controlling an industrial vehicle that carries objects inside a building, wherein the industrial vehicle includes a propulsion drive system, a guidance and navigation system, and a wireless communicator for bidirectional communication with an asset management computer located remotely from the industrial vehicle, said method comprising:
 (a) operating the industrial vehicle in an unmanned, autonomous mode that comprises:
 the guidance and navigation system sensing environmental conditions outside the vehicle and in response thereto controlling the propulsion drive system to direct the industrial vehicle to travel along a first path inside the building,
 gathering operational data regarding the industrial vehicle,
 transmitting the operational data and an alert message, from the wireless communicator onboard the industrial vehicle to the asset management computer located remotely from the industrial vehicle in response to a sensor detecting that the industrial vehicle has become incapacitated, wherein the operational data and the alert message relate to a rechargeable energy source onboard the industrial vehicle requiring recharging, and
 directing the industrial vehicle along a second path to a recharging area in the building in response to the operational data and the alert message from the wireless communicator;
 (b) operating the industrial vehicle in manual mode that comprises:
 the industrial vehicle receiving control signals from operator controls that are manipulated by human operator onboard the industrial vehicle, and
 controlling the propulsion drive system in response to the control signals to direct the industrial vehicle to travel along a third path inside the building; and
 (c) operating the industrial vehicle in a remote control mode that comprises:
 the industrial vehicle receiving commands from the asset management computer in response to the operational data and the alert message from the wireless communicator, wherein the commands comprise a command that directs steering of the industrial vehicle and another command specifies a velocity at which a wheel propels the industrial vehicle to overcome the incapacity, and controlling the propulsion drive system in response to the commands, without an onboard operator.

* * * * *